(12) United States Patent
Moriwaki et al.

(10) Patent No.: US 6,258,480 B1
(45) Date of Patent: Jul. 10, 2001

(54) BATTERY AND METHOD OF MANUFACTURING THEREFOR

(75) Inventors: Yoshio Moriwaki; Akira Iwase; Susumu Kitaoka, all of Hirakata; Mamoru Iida, Kadoma; Isao Matsumoto, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/284,304

(22) PCT Filed: Sep. 2, 1998

(86) PCT No.: PCT/JP98/03942
§ 371 Date: Apr. 9, 1999
§ 102(e) Date: Apr. 9, 1999

(87) PCT Pub. No.: WO99/13520
PCT Pub. Date: Mar. 18, 1999

(30) Foreign Application Priority Data

Sep. 8, 1997 (JP) .................................................. 9-243120

(51) Int. Cl.⁷ .................................................. H01M 02/04
(52) U.S. Cl. .......................... 429/176; 429/163; 429/185; 29/623.1; 29/730
(58) Field of Search .................................... 429/176, 164, 429/163, 167, 168, 185, 177, 174; 72/349, 46; 29/623.1, 730

(56) References Cited

U.S. PATENT DOCUMENTS 4,576,881 * 3/1986 Hasenauer et al. .................. 429/104
5,518,836 * 5/1996 McCullough .......................... 429/94
5,787,752 * 8/1998 Iwase et al. ........................... 72/349
5,869,208 * 2/1999 Miyasaka ............................. 429/224

FOREIGN PATENT DOCUMENTS

| 60-180058 | * | 9/1985 | (JP) | ............................. H01M/02/02 |
| 63-37066 | * | 3/1988 | (JP) | . |
| 2-150660 | * | 12/1990 | (JP) | . |
| 7-99686 | * | 10/1995 | (JP) | . |
| 8-162074 | * | 6/1996 | (JP) | . |
| 8-255598 | * | 10/1996 | (JP) | . |
| 8-329908 | * | 12/1996 | (JP) | . |

* cited by examiner

*Primary Examiner*—Gabrielle Brouillette
*Assistant Examiner*—Raymond Alejandro
(74) *Attorney, Agent, or Firm*—Jordan and Hamburg LLP

(57) ABSTRACT

A battery accommodates elements for electromotive-force within a metal case. This metal case is a metal case having a bottom wherein the bottom thickness/side thickness ratio has a value of 1.2–4.0 and has a cylindrical, prismatic or similar shape. The metal case is constructed of a metal material whose chief constituent is aluminum. Furthermore, it is desirable that a multiplicity of shallow grooves perpendicular to a bottom face are formed in at least a battery inside face of the metal case and moreover that a nickel layer is provided on the battery inside face. The metal case is made by DI processing involving drawing and ironing, to have a value of bottom thickness/side thickness ratio which was hitherto unavailable, i.e., 1.2–4.0 can be obtained.

28 Claims, 4 Drawing Sheets

BATTERY AND METHOD OF MANUFACTURING THEREFOR

TECHNICAL FIELD

The present invention relates to a battery such as a primary battery or secondary battery and in particular relates to improvements in the outer metal jacket (metal case) of a cylindrical or prismatic battery.

BACKGROUND ART

In recent years, as portable devices have become increasingly widespread, demand for miniature primary batteries and secondary batteries has increased. The chief types of primary batteries are manganese dry batteries or alkali manganese dry batteries or lithium batteries, and large numbers of these are used depending on the respective application. Also, as secondary batteries, considerable use has hitherto been made of nickel-cadmium accumulators, which are alkali accumulators in which an aqueous solution of alkali is employed as the electrolyte, and nickel-hydrogen rechargeable batteries, in which a hydrogen-absorption alloy is employed as the negative electrode. Recently however, lithium ion secondary batteries, which are characterized by light weight and high energy density, and employ an organic electrolyte, have suddenly appeared on the market.

Chiefly in the case of miniature secondary batteries for portable equipment, in addition to the cylindrical type and coin type, which were the typical conventional battery shapes, in recent years use of batteries of prismatic shape has increased, and, most recently, paper-form thin batteries have also appeared.

An important recent trend in the demands made on performance of such batteries is increasing demand for higher energy density of the battery. In general terms, there are two methods of indicating the energy density of a battery. One of these is volumetric energy density (Wh/l); this is used as an index of battery miniaturization. Another is weight energy density (Wh/kg); this is used as an index of battery weight reduction.

Batteries of high volumetric energy density and high weight energy density, these respectively being indices of miniaturization and weight reduction, are highly prized by the market and there is fierce competition to increase the energy density of all types of battery.

What determines the level of energy density of a battery is principally the battery active materials of the positive electrode and/or negative electrode constituting the elements for electromotive-force, but apart from these the electrolyte and separators are also important. Very vigorous efforts are currently being made to improve these elements for increasing the energy density of the battery.

Meanwhile, miniaturization and weight reduction of the battery casing, i.e., the case of the battery that accommodates these elements for electromotive-force, which previously tended to be overlooked, has been in recent years re-evaluated as an important question and positive efforts are being made to achieve improvements in this respect. If the case of the battery can be made thinner, more battery active material can be accommodated in a portion of the same shape as conventionally but of reduced thickness, enabling the volumetric energy density of the battery as a whole to be raised. Also, if the battery case can be made of lighter material of lower specific gravity, the weight of the battery as a whole can be reduced by lowering its weight for the same shape as conventionally, and the weight energy density of the battery as a whole can thereby be raised.

Adoption of the DI (Drawing and Ironing) technique for the battery case is noteworthy as a previous technique for improving volumetric energy density. Conventionally, drawing processing was chiefly employed for manufacturing battery cases using iron-based metal material, but recently the DI technique, using both drawing and ironing, has attracted attention. Known methods for manufacturing a battery case are the technique (hereinbelow called "drawing-only technique") in which a battery case of prescribed shape is manufactured by repeating a plurality of deep-drawing steps using a press, and the so-called "DI technique", which is a technique in which a cylindrical battery case of pre-scribed shape is manufactured from a cup-shaped intermediate product obtained by manufacturing a cup-shaped intermediate product by a deep-drawing step using a press, followed by an ironing step using an ironing machine; this technique is known from Japanese Patent Publication No. 7-99686 etc.

Compared with the "drawing-only technique", the "DI technique" has the advantages of increased productivity due to diminution in the number of process steps, weight reduction and increased capacity due to reduction in thickness of the circumferential walls of the case, and reduction in stress corrosion etc., and for these reasons its rate of utilization is increasing. Also, conventionally, in the above method of manufacture, nickel-plated steel sheet, which is of comparatively high hardness, was employed as the battery case blank material in order to ensure sufficient pressure-resisting strength of the battery case and sufficient strength of the sealing portion. This DI technique enables the thickness of the case walls to be reduced and is said to make possible an improvement in volumetric energy density of the battery of about 5%.

Also, a well known example in which the battery case is changed to a lightweight material of lower specific gravity is provided by the case of prismatic lithium batteries, in which aluminum alloy sheet (specific gravity: about 2.8 g/cc) is employed instead of the conventional rolled steel sheet (specific gravity: about 7.9 g/cc). Efforts have been made towards weight reduction of batteries for use in portable telephones and, as a result, in this case also, examples are known in which an improvement of about 10% in weight energy density of the battery as a whole has been achieved by weight reduction of the case by changing the blank material to aluminum alloy. An example of a secondary battery using such an aluminum case is disclosed in Japanese Patent Laid-Open No. 8-329908. Impact processing or drawing processing have frequently been used as methods of manufacturing battery cases using aluminum or aluminum alloy.

Although there is some variation depending on battery size, if cold-rolled steel sheet is employed, the weight ratio represented by the case to that of the overall battery weight in batteries that have been practically employed up to the present is about 10~20 wt. % in the case of a cylindrical nickel/hydrogen rechargeable battery or lithium ion secondary battery; in the case of a prismatic nickel/hydrogen rechargeable battery or lithium ion secondary battery, this is about 30~40 wt. % i.e. twice the value for the cylindrical type. Recently, by employing aluminum or aluminum alloy for the case of prismatic lithium ion secondary batteries, this value has been reduced to 20~30 wt. %.

While these trends to miniaturization and weight reduction of the battery case are effective in improving battery energy density, on the other hand, in batteries, chemical reactions involving changes in the substances in the charging or discharging reaction are employed, and reliability of quality and safety therefore constitute properties which are just as important in use as energy density and cannot be neglected. In the case of primary batteries that are employed exclusively for discharge, guaranteeing capacity and/or prevention of leakage over a long period of storage, and reliability of qualities such as stable discharge performance are indispensable. In the case of secondary batteries that perform repeated charging and discharging, in addition to the properties demanded for primary batteries, performance such as cycle life and safety are even more important.

Conventionally, it was extremely difficult to maintain both high energy density and quality reliability together with safety in respect of such battery cases. Specifically, if it was attempted to obtain high energy density, deformation of the battery case or cracking under abnormal conditions frequently gave rise to problems such as leakage of electrolyte. On the other hand, if the case was made strong, this often resulted in high energy density being sacrificed; an effective method of improving the trade-off relationship between these two had not been discovered.

In the techniques for manufacturing a case as indicated above, a method based on the DI technique using drawing and ironing is excellent in that it enables relative satisfaction of both improved battery energy density i.e. thin walls and light weight and battery quality reliability together with safety. However, in this connection, further improvement in performance and quality reliability together with safety has been demanded.

Demands for such battery miniaturization and weight reduction in the market for primary batteries and secondary batteries is strong and more convenience is also sought. On the other hand, quality reliability and safety of such batteries are indispensable; previously, both of these two, namely, improved battery energy density making possible battery miniaturization and weight reduction, and quality reliability and safety, were insufficiently satisfied.

Also, regarding the technique of manufacturing the case of aluminum-based metal material, with the conventional method, reduction in thickness of the case walls was insufficient and, as a result, miniaturization and weight reduction of the battery was insufficient.

The present invention was made in the light of the above problems. Its object is to provide a battery and method of manufacturing it whereby miniaturization and weight reduction of the case of cylindrical shape or prismatic shape or shape similar thereto employed in primary batteries or secondary batteries can be achieved and the energy density of the battery can be raised, and also in which battery quality reliability and safety can be satisfied.

DISCLOSURE OF THE INVENTION

The present invention provides a battery accommodating elements for electromotive-force within a metal case; this metal case being a metal case having a bottom wherein the bottom thickness/side thickness ratio has a value of 1.2~4.0 and having a cylindrical, prismatic or shape similar thereto; this metal case being constructed of a metal material whose chief constituent i. e. substantially composed of, is aluminum, or an alloy material whose chief constituent is aluminum. Also, in the above, it relates to a battery wherein a multiplicity of shallow grooves perpendicular to the bottom face are formed in at least the battery inside face of the metal case or wherein the depth of the grooves formed in the battery inside face is 0.5~10.0 μm.

Also a battery as aforesaid may include in a battery wherein the metal case is constituted of a metallic material whose chief constituent is aluminum or an alloy material whose chief constituent is aluminum, and a nickel layer of thickness less than 30 μm is provided on at least either the battery inside face or outer face.

The present invention further includes in a method of manufacturing a battery in which a sheet of metallic material, whose chief constituent is aluminum, or a sheet of alloy material, whose chief constituent is aluminum, is subjected to continuous ironing processing (DI processing) form into a side part of a case formed in a tubular shape having a bottom, such that the ironing ratio (where the ironing ratio (%) is defined as follows: ironing ratio (%)= (original thickness−thickness after ironing)×100/original thickness) is in the range, 10~80%, and wherein a metal case having a bottom and being of a cylindrical shape, prismatic shape or shape similar thereto, which is formed with a multiplicity of shallow grooves perpendicular to the bottom face in the battery inside face and which has a value of bottom thickness/side thickness of 1.2~4.0 is thereby manufactured. In this case, preferably for the metallic material sheet whose chief constituent is aluminum or the alloy material sheet whose chief constituent is aluminum, a sheet provided with a nickel layer on at least either the battery inside face or outside face is employed and ironing is performed continuously such that the ironing ratio is in the range 30~80%.

DETAILED DESCRIPTION

Figure 1:
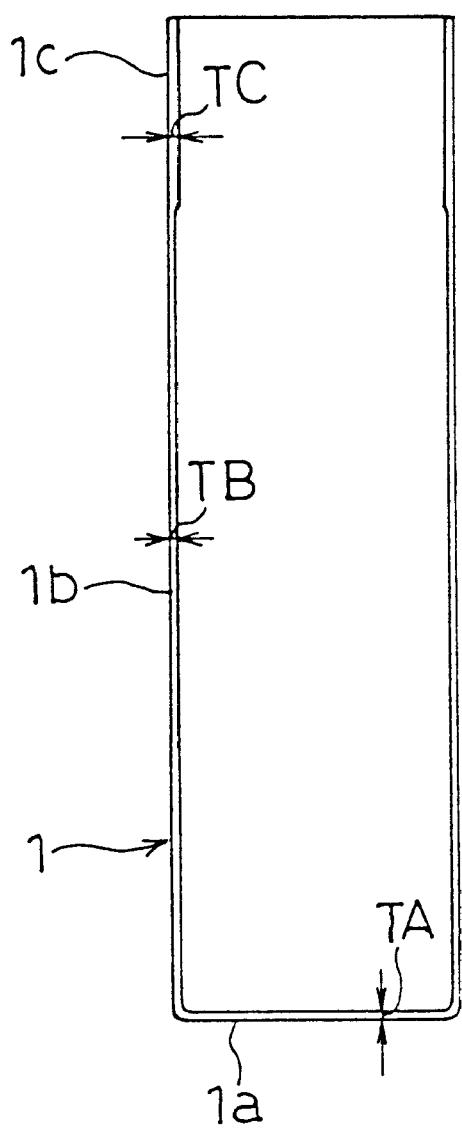
FIG. 1 is a view showing a cross-section of a metal case of cylindrical shape having a bottom employed in an embodiment of the present invention.

A battery according to the present invention is a battery accommodating elements for electromotive-force within a metal case. The metal case is a metal case having a bottom wherein the bottom thickness/side thickness has a value of 1.2~4.0 and having a cylindrical, prismatic or shape similar thereto. The metal case is constructed of a metal material whose chief constituent is aluminum, or an alloy material whose chief constituent is aluminum. No conventional batteries using a metal case constituted of a metallic material whose chief constituent is aluminum having a cylindrical or similar form and whose bottom thickness/side thickness has a value of 1.2~4.0 are known. Some examples of batteries made using a metal case having a prismatic shape or shape similar thereto are known, but, in all cases, the bottom thickness/side thickness is less than 1.2. Batteries using a metal case having a bottom thickness/side thickness with a value of 1.2~4.0 are not known. The present invention is characterized in particular by DI processing using drawing and ironing of a metal case. By this means, values of the bottom thickness/side thickness which were not available conventionally are achieved. According to the present invention, both high battery energy density, i.e., thin walls and light weight, together with reliability of battery quality and safety can be satisfied.

Also, in a battery according to the present invention, a multiplicity of shallow grooves perpendicular to the bottom face are formed in at least the battery inside face of the metal case, in other words, a multiplicity of shallow grooves parallel to the axial direction of the metal case are formed in the battery inside face of the side walls of the metal case. In this case, the depth of the grooves is preferably in particular about 0.5~10.0 µm. The surface condition of the battery inside face of conventional metal cases is comparatively flat, but, by forming the battery inside face of a metal case according to the present invention with a multiplicity of shallow grooves perpendicular to the bottom face, the benefit is obtained that the electrical contact resistance of the electrode plates, constituting the elements for electromotive-force, and the metal case is enormously reduced.

Also in these batteries, the metal case is constituted of a metallic material whose chief constituent is aluminum or an alloy material whose chief constituent is aluminum, and a nickel layer of a thickness less than 30 µm on at least either the battery inside face or outer face. By providing a nickel layer of under 30 µm thickness on the battery inside face, direct contact of the aluminum of the blank material with the electrolyte is eliminated, and, as a result, the benefit is obtained of increasing the corrosion resistance of the metal case. Also, by providing a nickel layer of under 30 µm on the outside face of the battery, the lead connection strength can be raised when a battery pack is constituted by connecting a plurality of cells.

Also, the HV value, indicating the Vickers hardness, of the side walls of the metal case after formation of the metal case of the aforementioned batteries should have a value of at least 1.2 times the HV value of the metal material, whose chief constituent is aluminum, or the alloy material, whose chief constituent is aluminum, of the blank material used for the metal case; thus the processing hardness value of the metal case is restricted.

Further, in the aforesaid batteries, regarding the thickness of the side walls of the metal case, the side thickness in the vicinity of the battery sealing aperture may be at least 10~30% thicker than the side thickness in other areas. This is because when the battery is used, the chief weakness in regard to pressure withstanding strength, when the pressure within the battery rises, is in the vicinity of the battery sealing aperture. It is therefore possible to maintain the sealing strength by making the side thickness in the vicinity of the battery sealing aperture, which is usually inferior in its ability to withstand pressure, at least 10~30% thicker than the side thickness in other portions.

Further, in a battery as aforesaid, where the metal case has a prismatic shape or shape similar thereto, the corner parts of the battery inside face in the longitudinal cross-sectional plane and transverse cross-sectional plane of this metal case may have a curved shape of radius of curvature under 0.5 mm. By making the radius of curvature of the corner parts of the battery inside face less than 0.5 mm, the ability of the battery to withstand internal pressure is raised and the elements for electromotive-force, such as the positive electrodes, negative electrodes and separator, are accommodated within the battery in less wasteful manner.

A method of manufacturing a battery according to the present invention includes a method of manufacturing a battery in which a sheet of metallic material, whose chief constituent is aluminum, or a sheet of alloy material whose chief constituent is aluminum, is subjected to drawing forming into a tubular shape having a bottom, and continuous ironing is performed such that the ironing ratio of the side of the case formed in the aforesaid tubular shape having a bottom is in the range 10~80%, thereby manufacturing a metal case having a bottom and which is of cylindrical, prismatic or similar shape having a bottom thickness/side thickness of a value of 1.2~4.0, formed with a multiplicity of shallow grooves perpendicular to its bottom face on the battery inside face, this being used to produce the battery. In this case, it is beneficial if the metallic material sheet, whose chief constituent is aluminum, or alloy material sheet whose chief constituent is aluminum, is constituted by providing a nickel layer on at least either the battery inside face or outside face. Preferably, also, ironing is performed continuously such that the ironing ratio is in particular in the range 30~80%.

The method of manufacture of a battery according to the present invention has the benefit that a metal case having a bottom and wherein the bottom thickness/side thickness has a value of 1.2~4.0 can be manufactured with a high ironing ratio of metallic material sheet whose chief constituent is aluminum or alloy material sheet whose chief constituent is aluminum.

Next, specific examples of the present invention is described.

As a first embodiment of the present invention, a lithium ion secondary battery of cylindrical shape is described wherein the metal case material is an alloy material, whose chief constituent is aluminum, formed with a multiplicity of shallow grooves perpendicular to its bottom face in at least battery inside face of the metal case.

First of all, a metal case used in this battery is described with reference to FIG. 1 and FIG. 2. As the alloy material whose chief constituent is aluminum, from Al—Mn based alloys (3000 type) which are wrought products of non-heat treated alloys, 3003 alloy was selected. A sheet 2 of 3003 alloy of thickness 0.5 mm was first of all punched out to circular shape and then subjected to drawing using a press to manufacture a metal case cup 3 having a bottom of external diameter 21.5 mm and height 15.5 mm. In the condition of this cup, little change in either bottom thickness or side thickness was found in comparison with the blank material.

Next, this metal case cup 3 having a bottom was introduced into a DI metal mold, where a DI metal case having a bottom of external diameter 13.8 mm, and a height 54.0 mm was manufactured by continuous ironing. Since, in this condition, an upper side part (lug) 5 of the metal case is not level, but has a somewhat distorted shape due to the processing, a DI metal case having a bottom, i.e., metal case 1 of external diameter 13.8 mm, height 49.0 mm was formed by cropping upper side part 5. FIG. 1 shows a cross-sectional view of this metal case 1 having a bottom.

Figure 2:
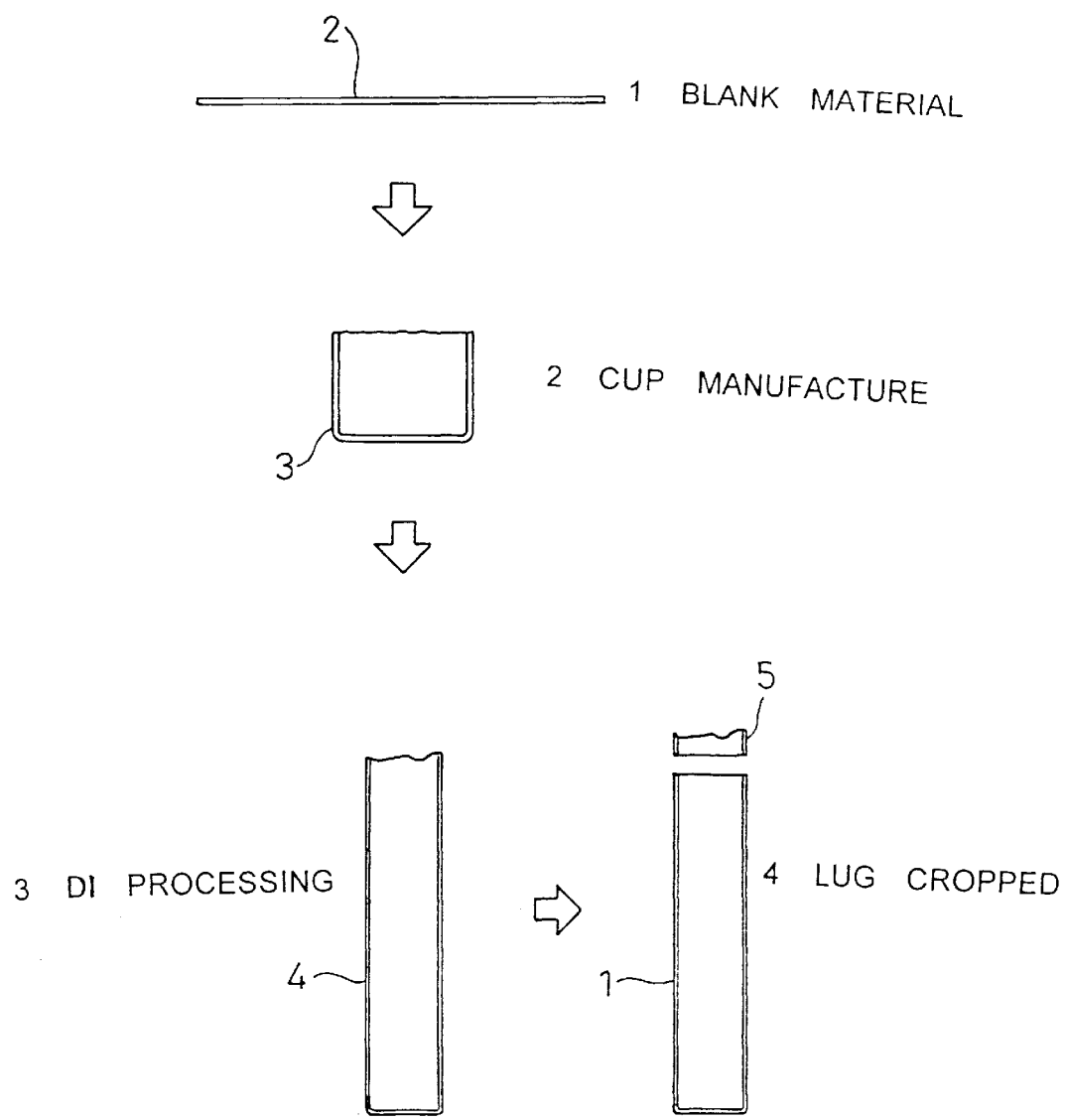
FIG. 2 is a process diagram showing manufacturing steps of above metal case.

The thickness of the bottom wall 1a of this metal case 1 shown in FIG. 1, i.e. a bottom thickness (TA) is 0.5 mm, and the thickness of side wall 1b, i.e., a side thickness (TB), is 0.35 mm, representing an ironing ratio of 30%. Also, bottom thickness (TA)/side thickness (TB)=1.43. The side thickness (TB) indicated here is the side thickness at intermediate height of metal case 1 and indicates the mean value of the side thickness. Furthermore, a side thickness (this is called the sealing aperture vicinity side thickness, TC) at a position 5 mm below the upper aperture, constituting the sealing aperture vicinity portion 1c in the metal case is indicated. Metal case 1 was manufactured such that the sealing aperture vicinity side thickness (TC) was about 11% thicker, at 0.39 mm, than the side thickness (TB) of the intermediate portion, with the object of raising the sealing aperture strength.

The HV value, indicating the Vickers hardness of the 3003 alloy sheet before processing of the metal case was 30 and the HV value of side wall 1b after forming the metal case was 71, i.e. the HV value was increased by a factor of 2.37 by the DI processing.

According to the present invention, a multiplicity of shallow grooves perpendicular to a bottom face are formed in a battery inside face in the process of manufacturing a DI case by continuous ironing. This multiplicity of shallow grooves perpendicular to the bottom face on the battery inside face are scratch marks of the metal mold in the DI case manufacturing process. Such scratch marks can be formed by introducing comparatively hard particles such as of alumina during DI processing. A multiplicity of shallow grooves perpendicular to the bottom face can therefore easily be formed by DI processing by forcibly dispersing alumina powder on the surface of the inside face of the metal case cup having a bottom.

By observing the surface of the battery inside face of the metal case produced by DI processing using a scanning electron microscope, it was confirmed that a multiplicity of well-formed grooves perpendicular to the bottom face were produced. In this case, the depth of these grooves was, in particular, about 0.5~3 μm. In this way, manufacture of a metal case employed in a battery according to the present invention was completed.

Next, a cylindrical lithium ion secondary battery was manufactured using a metal case manufactured as described above. First of all, a positive electrode and separator and negative electrode constituting the elements for electromotive-force were prepared. For the positive electrode, $LiCoO_2$ and a conducting agent including acetylene black, and a fluorinated resin binder etc., mixed into the form of a paste, was applied to an aluminum foil substrate which was then dried, pressurized and cut to form an electrode of prescribed dimensions. In order to effect direct contact of this positive electrode with the metal case of the battery, the positive electrode was provided with a portion consisting solely of aluminum foil substrate. For the separator, polyethylene micro-pore film of thickness 0.027 mm was employed. For the negative electrode, a binder, styrene butadiene rubber (SBR) and a thickener, carboxymethyl cellulose (CMC) etc. were added to spherical graphite to form a paste, which was then applied to a copper foil substrate which was then dried, pressurized and cut to form an electrode of prescribed dimensions.

Next, the positive electrode and negative electrode were wound in spiral fashion with interposition of a separator and accommodated in the metal case referred to above. In this case, the outermost peripheral portion, when thus wound in spiral fashion, is the portion of the positive electrode consisting solely of aluminum foil substrate, so the positive electrode terminal of the metal case and the positive electrode plate are directly electrically connected. Also, connection between the negative electrode terminal constituted by a cap part of the sealed battery and the negative electrode plate was effected by a nickel lead.

As the electrolyte, an electrolyte was employed obtained by blending ethylene carbonate (EC)-diethyl carbonate (DEC) in a mol ratio of 1:3 and dissolving lithium hexafluoro phosphate ($LiPF_6$) in a ratio of 1 mol/l. A sealed battery was obtained by pouring this electrolyte into a battery, and sealing the metal case and sealing aperture cap by ordinary laser aperture sealing. This battery was of cylindrical type (size AA) of diameter 14 mm, height 50 mm. The battery capacity was 600 mAh. This battery will be referred to as cell A of this embodiment.

In order to compare the performance of cell A of this embodiment, manufacture and evaluation of a cell B as a comparative example were conducted. The differences between cell A of this embodiment and cell B lay in the construction of the metal case.

Specifically, although cell B was the same as cell A in that 3003 alloy sheet of thickness 0.5 mm was used, the manufacture of its case employed the drawing-only method; the bottom thickness of the metal case obtained by this case-drawing was 0.5 mm, but the side thickness was 0.43 mm, giving a value of the bottom thickness/side thickness=1.16. Also, the battery inside face of the metal case of cell B was comparatively flat, without formation of a multiplicity of shallow grooves perpendicular to the bottom face.

The following could be said on comparing the performance of these two cells A and B. Firstly, the side thickness of the metal case is 0.08 mm thicker in the case of cell B than in the case of cell A; as a result, the effective volume for accommodating the elements for electromotive-force of the battery was reduced by about 2.5% in comparison with cell A; thus, the battery capacity of cell B was 585 mAh, representing a reduction in volumetric energy density of about 2.5%.

Figure 3:
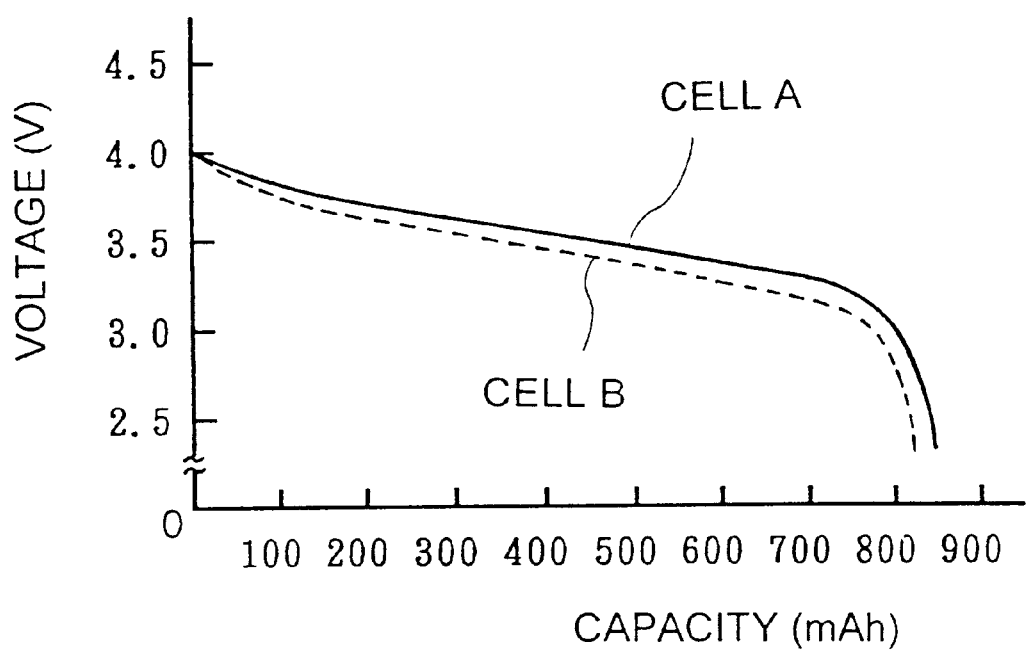
FIG. 3 is a view comparing the high-rate discharge characteristics of a cell A used in an embodiment of the present invention and a cell B according to a comparative example.

Secondly, a difference in high-rate discharge performance was found. FIG. 3 shows a comparison of the characteristics of high-rate (1 CmA) discharge at 20° C. As shown in FIG. 3, at intermediate discharge voltage, the discharge voltage of cell B was lower than that of cell A by about 30~50 mV at 1 CmA, and, as a result, considerable problems were displayed under high-rate discharge conditions occurring in actual battery use. In recent years, in such lithium ion secondary batteries, high-rate discharge characteristic is seen as important in practical use and a large drop of voltage under fixed W discharge is a fairly serious problem. In this regard, it is confirmed that cell A of this embodiment shows a benefit of suppression of the drop of discharge voltage under high-rate discharge conditions, thanks to the formation of a multiplicity of shallow grooves perpendicular to the bottom face in the battery inside face of the metal case.

It was confirmed that cell A of this embodiment had better performance than cell B of the comparative example in respect of energy density and high-rate discharge, as mentioned above. In other evaluations, a marked difference was not found between the two batteries.

Due to the above construction, according to the present invention, compared with the case where iron-based steel sheet etc., which was conventionally frequently employed as the metal case having a bottom was used, the weight of the metal case itself can be made lighter and the weight energy density of the battery can be greatly raised. Also, due to the raised value of bottom thickness/side thickness, iLt was found that processing hardening of the blank material could be promoted and higher strength achieved in spite of reduced thickness. In this way, a battery according to the invention combines both the looked-for high battery energy density and high reliability.

Next, as a second embodiment of the present invention, a prismatic lithium ion secondary battery is described wherein the metal case material is an alloy material whose chief constituent is aluminum, a multiplicity of shallow grooves perpendicular to the bottom face are formed in at least the battery inside face of the metal case, and a nickel layer is provided on the battery inside face.

For the metal case used in the battery, 3003 alloy was selected from Al—Mn based alloys (3000 type) constituting a wrought product of non-heat treated alloy, as the alloy material whose chief constituent is aluminum. A metal case cup having a bottom was manufactured by drawing processing, by pressing a sheet of 3003 alloy of thickness 0.6 mm, both of whose faces had been nickel-plated with a thickness of 5 μm. In this cup condition, little difference was found in the bottom thickness and side thickness in comparison with the blank material.

Figure 4:
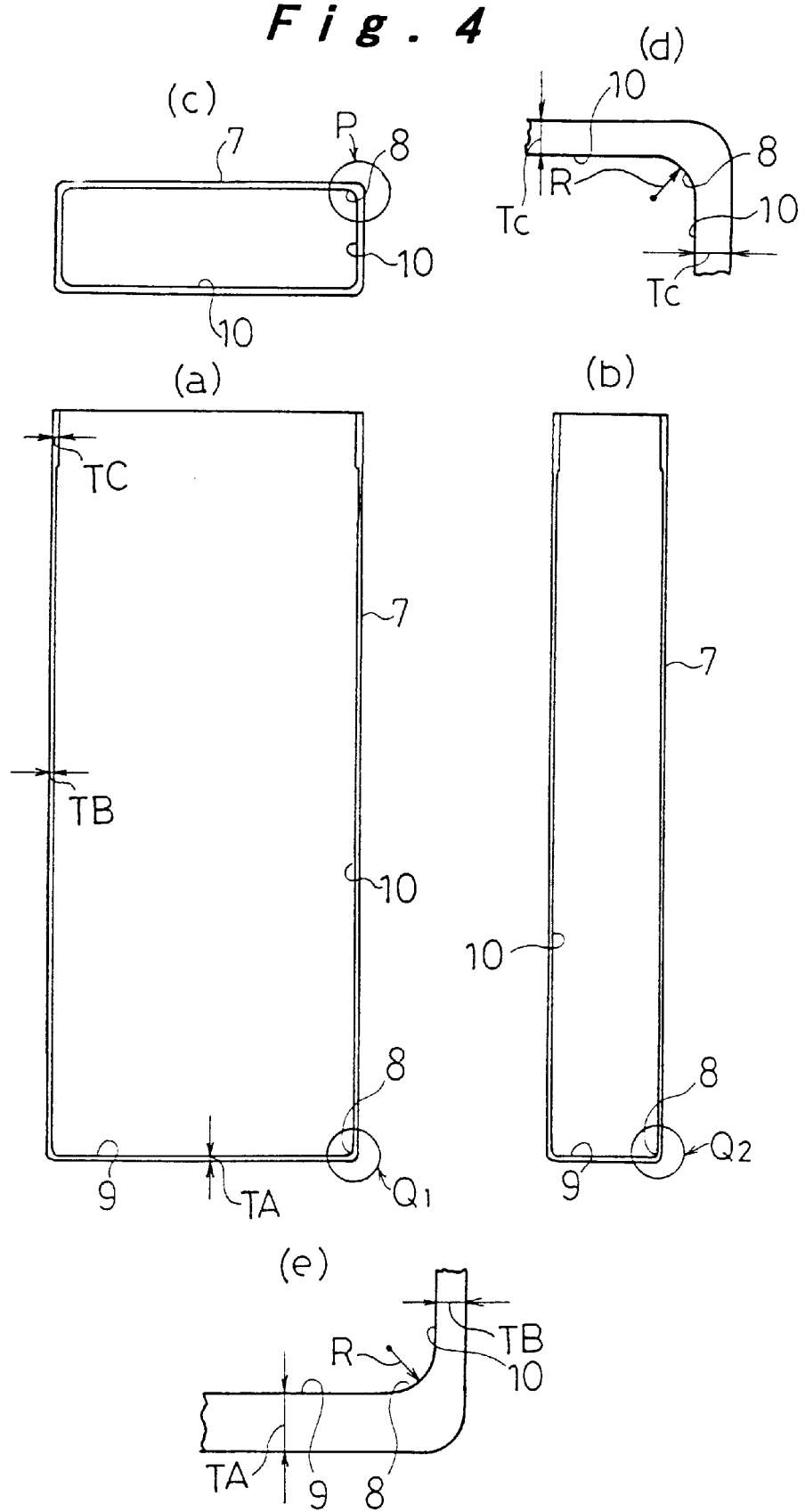
FIG. 4 shows a metal case of prismatic shape having a bottom used in a further embodiment of the present invention, (a) being a longitudinally-sectioned front view, (b) being a longitudinally-sectioned side view, (c) being a plan view, (d) being a view to a larger scale of the portion indicated by P in (c), and (e) being a view to a larger scale of the portions indicated by $Q_1$ and $Q_2$ respectively in (a) and (b).

Next, this metal case cup having a bottom was introduced into a DI metal mold, and a DI metal case was manufactured having external diameter dimensions: width 22 mm, height 52 mm, thickness 8 mm, by continuous ironing. Since in this condition the top of the side part (lug) of the metal case was not flat, but somewhat distorted due to the processing, the upper part of the side was cropped to obtain a metal case having a bottom of height 48 mm. As shown in FIG. 4, the bottom thickness (TA) of this metal case 7 was 0.6 mm, and the side thickness (TB) was 0.45 mm, representing an ironing ratio of 25%. Also, the value of bottom thickness/side thickness=1.33. The side thickness (TB) indicated herein is the side thickness an intermediate height of the metal case 7 and indicates the mean value of the side thickness.

In addition, the side thickness (this will be called the sealing aperture vicinity side thickness, TC) at a position 5 mm below the aperture at the top, constituting the sealing aperture vicinity portion of the metal case 7, is indicated. Metal case 7 was manufactured such that sealing aperture vicinity side thickness (TC) was about 11% thicker, at 0.5 mm, than the side thickness (TB) of the intermediate portion, with the object of improving the sealing aperture strength.

The HV value, indicating the Vickers hardness of the sheet of 3003 alloy prior to processing of metal case 7 was 30, while the HV value of the side wall after formation of the metal case was 58, representing an increase in HV value due to DI processing by a factor of 1.93.

In the process of manufacturing the DI case by this continuous ironing process, a multiplicity of shallow grooves were formed in the battery inside face in the direction parallel to an axis of, metal case 7, i.e., the direction perpendicular to the bottom face. Also, the radius of curvature R of the curved shapes constituted by corners 8 of the battery inside face by the metal mold in the DI case manufacturing step, i.e., the corner defined by bottom face 9 and side face 10 and the corner defined by side face 10 was 0.4 mm. Normally, in the case of a prismatic battery, it is beneficial in regard to the internal pressure strength for the value of this radius of curvature R to be large; however, in order to maintain effective internal pressure strength in a restricted effective volume and to accommodate the elements for electromotive-force etc. an effective manner, it is important that the radius of curvature R should be less than 0.5 mm, and, in this embodiment, as shown in FIG. 4, the radius of curvature R of these corners 8 was made 0.4 mm. By this means, even though the wall thickness of the metal case is reduced, the strength in resisting internal pressure of the battery can be maintained.

Next, a prismatic lithium ion secondary battery was manufactured using a metal case manufactured as described above. First of all, the positive electrode and separator and negative electrode constituting the elements for electromotive-force were prepared. For the positive electrode, $LiCoO_2$ and a conductive agent including acetylene black and a fluorinated resin binder etc. mixed into the form of a paste, was applied on to an aluminum foil substrate, which was then dried, pressurized and cut to form an electrode of prescribed dimensions. A lead was mounted on this positive electrode plate in order to make possible connection to the positive electrode terminal of the battery. For the separator, polyethylene micro-pore film of thickness 0.027 mm was employed. For the negative electrode, styrene butadiene rubber (SBR) binder and carboxymethyl cellulose (CMC) thickener etc. were added to spherical graphite to produce a paste, which was applied on to a copper foil substrate, which was then dried, pressurized and cut to form an electrode of prescribed dimensions. In order to achieve direct contact with the metal case of the battery, this negative electrode was provided with a portion consisting solely of the copper foil substrate of the negative electrode.

Next, the positive and negative electrodes were wound in spiral fashion with the separator therebetween, and accommodated in the metal case referred to above. In this case, the outermost circumferential portion, that is wound in spiral fashion is the portion constituted solely by the copper foil substrate of the negative electrode, so that direct electrical contact is made between the negative electrode and the negative electrode terminal of the metal case. Also, connection of the positive electrode plate and positive electrode terminal constituted by a cap of the sealed battery was achieved by an aluminum lead. As the electrolyte, an electrolyte was obtained by blending ethylene carbonate (EC) and diethyl carbonate (DEC) in mol ratio 1:3 and dissolving lithium hexafluoro phosphate ($LiPF_6$) therein in the ratio of 1 mol/l. This electrolyte was poured into the battery, and a sealed battery was obtained by sealing of the aperture cap with the metal case using ordinary laser sealing. This battery was of prismatic shape of width 22 mm, height 48 mm, and thickness 8 mm, the battery weight being about 18 g. The battery capacity was 600 mAh. This battery was designated as cell C according to the present invention.

It should be noted that this embodiment differs from the first embodiment described above in respect of the polarity of the metal case. Whereas in embodiment 1 described above the metal case constituted a positive electrode and was connected to the positive electrode plate, in this embodiment, the metal case constitutes a negative electrode and is connected to the negative electrode plate.

In order to compare the performance with cell C of this embodiment, cells D and E were manufactured and evaluated as comparative examples. The difference between cell C of the present embodiment and cells D and E lies in a different construction of the metal case. Specifically, the differences from cell C of the present embodiment lie in that cell D was obtained by directly processing a sheet of 3003 alloy of thickness 0.6 mm to a metal case having a bottom without first nickel-plating the sheet surface, and cell E was obtained by subjecting a sheet of 3003 alloy of thickness 0.6 mm whose surface had been subjected to nickel-plating to a thickness of about 1 μm to processing to a metal case. It should be noted that the shapes of the metal cases of cells D and E were the same as that of cell C of the present embodiment, and they both shared the feature of formation of a multiplicity of shallow grooves perpendicular to the bottom face on the battery inside face in the DI case manufacturing step in which continuous ironing was performed.

Conventionally, in this field of lithium ion secondary batteries, it is well known that, in the case of a combination in which the negative electrode is an electrode employing graphite and the metal case contacting the negative electrode is aluminum or aluminum alloy material, in the charging reaction of the battery, in the condition below a certain potential, the lithium ions react with the aluminum constituting the metal case rather than reacting with the graphite. By this reaction, the aluminum constituting the metal case crumbles away by formation of a chemical compound with the lithium and the lithium is stabilized by reaction with the aluminum, so, as can easily be imagined, making discharge difficult and, as a result, deterioration of performance of the battery can be predicted beforehand.

This was investigated by provoking an actual discharging reaction using cells C, D and E. For the charging of the cells, constant-voltage constant-current charging was performed at 20° C. up to 4.2 V with a maximum of 0.5 A; discharging was performed to a final voltage of 3 V at 20° C. by constant-current discharge of 120 mA. The cycle life of the cell was evaluated by repeating this charging and discharging.

As a result, in the cell C of this embodiment, very stable performance was shown as a result of a life test evaluated for up to 500 cycles. In contrast, cell D, on the first discharge cycle, could only be discharged to about 40% in terms of ratio to the discharge capacity of cell C and showed further sharp deterioration to 15% and 3% on the second discharge cycle and the third discharge cycle, becoming completely unusable as a battery. In contrast, in the case of cell E, while the discharge capacity ratio with respect to cell C was about 95% on the first cycle, there was a progressive reduction in discharge capacity on the second and third discharge cycles to 89% and 83% and by the fifteenth cycle the discharge capacity had become completely equal to zero. It should be noted that in the case of both of these batteries, electrolyte leakage and failure of the battery case occurred, by the fifth cycle in the case of cell D and by the nineteenth cycle in the case of cell E.

Although in the case of cell E a sheet of 3003 alloy of thickness 0.6 mm whose surface had been nickel-plated to a thickness of about 1 μm was employed for the metal case, observation of the surface of the metal case prior to constitution as a battery revealed pinholes in the nickel in all parts, caused by the nickel plating layer of the surface being too thin. It may be inferred that the loss of capacity of cell E and the failure of its metal case were the result of direct reaction of the lithium ions with the aluminum of the metal case due to these pinholes.

The above results show that in the case of a lithium ion secondary battery constituted with a metal case made of aluminum acting as the negative electrode and connected to the negative electrode plate the provision of a nickel layer on the battery inside face is essential. Furthermore, the thickness of this nickel layer must be such that the electrolyte and the aluminum of the metal case do not come into direct contact including through pinholes etc.; 3~5 μm appears necessary.

The above are embodiments of the present invention but supplementary description is given below to further describe aspects of the description of the above embodiments.

The bottom thickness/side thickness of the metal case whose chief constituent is aluminum according to the present invention is specified as 1.2~4.0. It might be desirable to have a higher value in order to reduce size and weight, but if the value is made high there are concerns regarding quality reliability and safety, and as a of several tests it was found that a range up to 4.0 is satisfactory. Also if this value is less than 1.2, the benefit in terms of raising battery energy density is insufficient. Although in the embodiments 3003 alloy was selected from Al—Mn based alloy (3000 type) constituting wrought product of non-heat treated alloy as the material whose chief constituent is aluminum that is employed herein, in the present invention various aluminum materials known as pure aluminum (JIS1000 grade) or aluminum alloy (JIS3000 or 4000 grade etc.) may be employed.

Next, it is a characteristic of the present invention that a multiplicity of shallow grooves perpendicular to the bottom face are formed in the battery inside face of the battery metal case and the depth of these grooves is preferably 0.5~10 μm.

Also, it is beneficial to provide a nickel layer of under 30 μm on the battery inside face of the metal case whose chief constituent is aluminum. This is because, whereas a construction in which the aluminum of the metal case is directly in contact with the electrolyte within the battery represents an impracticable battery system from the point of view of corrosion resistance, by providing a nickel layer of at least 3~5 μm but less than 30 μm on the battery inside face in such a battery system, the problem of corrosion resistance can be solved and the benefit of enabling the use of lightweight aluminum can be achieved. It is also beneficial to provide a nickel layer of up to 30 μm on the battery outside of the metal case whose chief constituent is aluminum. The strength of the lead connections when a plurality of batteries are connected as a pack can thereby be raised.

Furthermore, if, in regard to the thickness of the side wall of the metal case, the side thickness (TC) in the vicinity of the battery sealing aperture is made at least 10~30% thicker than the side thickness (TB) in the other portions, the benefits of the present invention can further emphasized. This is because ability of the battery to withstand internal pressure can be comparatively satisfactorily maintained even if the side thickness of the metal case is made quite thin. Rather the location where problems occur in such batteries in regard to pressure withstanding strength is the vicinity of the battery sealing aperture. In order to improve the pressure withstanding strength of the vicinity of the sealing aperture of batteries in which such pressure withstanding strength is a problem, it is effective to make the side thickness in the vicinity of the battery sealing aperture (TC) thicker than the side thickness in other portions (TB). By making it at least 10~30% thicker, it is possible to improve the balance of the whole by seeking thickness reduction of the metal case as a whole while yet ensuring necessary thickness of the vicinity of the battery sealing aperture which is important for pressure withstanding strength.

Moreover, with future increases in battery energy density, battery sizes continue to move in the direction of progressive miniaturization and reduction in overall thickness. In these circumstances it is desirable to make the thickness of the side wall of the metal case as small as possible. With the DI process of the present invention, a technical response to such requirements is feasible and the result has been achieved that small side thickness which was conventionally considered to be the limit with the impact process and transfer drawing process is being obtained. By this means, the thickness of the side wall of the metal case can be reduced to a level that was hitherto unavailable, enabling batteries of even higher energy density to be realized.

Although in the embodiments described above the examples of a cylindrical and prismatic lithium ion secondary battery were employed, the present invention can be applied apart from these to, for example primary batteries such as alkali manganese dry batteries or lithium primary batteries, or polymer lithium batteries and also to alkali accumulators exemplified by nickel cadmium accumulators or nickel-hydrogen rechargeable batteries etc.; in fact it can be applied to primary batteries or secondary batteries wherein the metal case is of cylindrical shape, prismatic shape or shape similar thereto, so long as they are batteries in which the elements for electromotive-force are accommodated in a metal case.

As described above, by means of the present invention, a high value that was previously unavailable of the bottom thickness/side thickness ratio of a metal case, whose chief constituent is aluminum, can be achieved. By this means, a battery combining both high battery energy density and high reliability together with safety, which was problematical with conventional batteries, can be provided; this is therefore useful as a technical response to requirements for battery size miniaturization and thickness reduction.

What is claimed is:

1. A battery comprising:
   elements for electromotive-force;
   a metal case which has a bottom and a side wall extending to a top edge defining a sealing aperture, said elements for electromotive-force being disposed in said metal case;
   said bottom having a bottom thickness and said side wall having a side thickness wherein a ratio of said bottom thickness to said side thickness is in the range of 1.2–4.0; and
   said metal case being formed of one of a metal material which is comprised substantially of aluminum and an alloy material which is comprised substantially of aluminum, wherein a Vickers hardness value of said side wall formation of said metal case has a value at least 1.2 times a Vickers hardness value of the metal material or the alloy material prior to formation into said case.

2. The battery of claim 1, wherein said side walls have an inside face defining a multiplicity of shallow grooves extending perpendicular to said bottom.

3. The battery of claim 2, wherein said shallow grooves have a depth which is in the range of 0.5–10.0 μm.

4. The battery of claim 1, further comprising the metal case having a nickel layer of a thickness less than 30 μm provided on at least one of an inside surface and an outside surface of said metal case.

5. The battery of claim 1, wherein said side wall has a side thickness at said sealing aperture which is at least 10–30% thicker than another side thickness of said side wall at another location.

6. The battery of claim 1, wherein said metal case has a substantially prismatic shape and interior corners of a radius of curvature less than 0.5 mm.

7. The battery of claim 6 wherein said side wall includes side wall sections adjoining one another at ones of said interior corners and said side wall adjoins said bottom at other ones of said interior corners.

8. A method of manufacturing a battery comprising the steps of:

providing a sheet of metallic material which is comprised substantially of aluminum and an alloy material which is comprised substantially of aluminum;

drawing forming said sheet into a metal case having a tubular shape with a bottom having a bottom thickness and a side wall having a side wall thickness and a top edge defining a sealing aperture;

ironing said side wall to have an ironing ratio in the range 10–80% and a ratio of said bottom thickness to said side thickness is in the range of 1.2–4.0;

forming a multiplicity of shallow grooves on an inside face of said side wall perpendicular to said bottom;

disposing elements for producing electromotive force in said metal case; and sealing said sealing aperture.

9. The method of manufacturing a battery of claim 8, further comprising the step of providing a nickel layer on at least one of an exterior surface and an interior surface of said metal can.

10. The method of manufacturing a battery of claim 8 or 9, wherein said ironing is performed continuously such that the ironing ratio is in the range of 30–80%.

11. The method of claim 8 wherein said multiplicity of shallow grooves are formed during said drawing.

12. The method of claim 8 wherein said multiplicity of shallow grooves are formed during said drawing by introducing hard particles.

13. The method of claim 8 wherein said hard particles are alumina.

14. The method of claim 8 wherein said providing said nickel layer includes providing said sheet with said nickel layer disposed thereon.

15. The method of claim 8 wherein said multiplicity of shallow grooves depth which is in the range of 0.5–10.0 μm.

16. The method of claim 8 wherein the nickel layer has a thickness less than 30 μm.

17. The method of claim 8 wherein said ironing produces said side wall has a side thickness at said sealing aperture which is at least 10–30% thicker than another side thickness of said side wall at another location.

18. The method 8 wherein said metal case is formed by said drawing and said ironing to have a substantially prismatic shape and interior corner of a radius of curvate less than 0.5 mm.

19. The method of claim 18 wherein said side wall includes side wall section adjoining one another at ones of said interior corners and said side wall adjoins said bottom at other ones of said interior corners.

20. The method of claim 8 wherein said bottom thickness is 0.5 mm.

21. The method of claim 20 wherein said ironing ratio is 30%.

22. The method of claim 20 wherein said ratio of said bottom thickness to said side thickness is 1.43.

23. The method of claim 8 wherein said bottom thickness is 0.5 mm.

24. The method of claim 8 wherein said drawing and said ironing provides a Vicker hardness value of said side wall after formation of said metal case that is at least 1.2 times a Vicker hardness value of the metal material prior to formation into said metal case.

25. The method of claim 24 wherein said drawing and said ironing provides a Vickers hardness value of said side wall of 71.

26. The method of claim 8 wherein said drawing and said ironing provides a Vickers hardness value of said side wall after formation of said metal case that is 2.37 times a Vicker hardness value of the metal material prior to formation into said metal case.

27. The method of claim 24 wherein said drawing and said ironing provides a Vickers hardness value of said side wall of 58.

28. The method of claim 8 wherein said drawing and said ironing provides a Vickers hardness value of said side wall after formation of said metal case that is 1.93 times a Vicker hardness value of the metal material prior to formation into said metal case.

* * * * *